US006925518B2

(12) United States Patent
Rudland et al.

(10) Patent No.: US 6,925,518 B2
(45) Date of Patent: Aug. 2, 2005

(54) BRIDGING SYSTEM FOR INTEROPERATION OF REMOTE GROUPS OF DEVICES

(75) Inventors: Philip A. Rudland, Broadstone (GB); Eduard G. Zondag, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 376 days.

(21) Appl. No.: 09/972,579

(22) Filed: Oct. 5, 2001

(65) Prior Publication Data

US 2002/0062417 A1 May 23, 2002

(30) Foreign Application Priority Data

Nov. 4, 2000 (GB) .............................................. 0026981

(51) Int. Cl.[7] .............................................. G06F 13/00
(52) U.S. Cl. .......................... 710/313; 710/17; 710/311
(58) Field of Search ............................. 710/8, 10, 15, 710/17, 104, 311, 312, 313, 314, 315

(56) References Cited

U.S. PATENT DOCUMENTS

| 5,754,548 A | * | 5/1998 | Hoekstra et al. ............. 370/402 |
| 6,363,434 B1 | * | 3/2002 | Eytchison .................... 719/313 |
| 2001/0047431 A1 | * | 11/2001 | Eytchison ................... 709/249 |
| 2002/0087964 A1 | * | 7/2002 | Sullivan ...................... 717/174 |

FOREIGN PATENT DOCUMENTS

| EP | 1058422 A1 | 12/2000 | .......... H04L/12/28 |
| WO | WO9965204 | 12/1999 | .......... H04L/29/06 |
| WO | WO0101632 | 1/2001 | .......... H04L/12/00 |
| WO | WO0119032 | 3/2001 | .......... H04L/12/28 |

OTHER PUBLICATIONS

"HAVi, the A/V digital network revolution", Technical Background white paper, HAVi Organization, San Ramon, CA, 1999 (accessed via www.havi.org on Apr. 2, 2004).*

* cited by examiner

*Primary Examiner*—Glenn A. Auve

(57) ABSTRACT

A bridging system for a communication system comprises a first gateway (107) and a second gateway (108) arranged to communicate with each other. Each gateway (107, 108) is connectable to a different bus (100, 105) of the communication system. The first gateway (107) is operative to communicate details of available devices (102, 103) on its respective bus (100) to the second gateway (108). The second gateway (108) is operative to generate at least one proxy element corresponding to each of said available devices (102, 103). Each proxy element is operative to communicate data and messages between devices (130) on the bus (105) of the second gateway (108) and the device on the first gateway (100) corresponding to the proxy element.

18 Claims, 3 Drawing Sheets

BRIDGING SYSTEM FOR INTEROPERATION OF REMOTE GROUPS OF DEVICES

The present invention relates to a bridging system that permits remote groups of devices, especially audiovisual devices, to interoperate.

A typical home audiovisual system includes a number of devices, e.g. a radio receiver, a tuner/decoder, a CD player, a pair of speakers, a television, a VCR, a tape deck, and so on. It is becoming more common for such devices to be interconnected in groups to allow one device, e.g. the television, to control another, e.g. the VCR. One device, such as e.g. the television, is likely to be the device the user will predominantly communicate with. This device is likely to provide central access and possibly control over the others in the group. Control buttons and switches are usually located on the front of the central device as well as on a handheld remote control unit. A user can control all devices by means of the central device or the remote control unit. As devices become more versatile and more complex, simple manual control is no longer sufficient.

Furthermore, as more and more devices become available, interoperability starts to become a problem. Many vendors use their own communication protocols to allow their devices to interact, but devices from different vendors cannot interact. To overcome these problems, several interoperability standards have been developed to allow devices to control each other. One well-known standard is the Home Audio-Video Interoperability (HAVi) standard, version 1.0 of which was published in January 2000, and which is available on the Internet at the address http://www.havi.org. Another well-known standard is the domestic digital bus (D2B) standard, a communications protocol described in IEC 1030. In a system compliant with such a standard, devices are interconnected in a network using a standard bus, e.g. an IEEE 1394 (referred to as 1394) serial communication bus, and exchange information, such as messages, data and commands, over this network according to the standard. Standards such as HAVi define the protocol for such exchanges, allowing devices from different vendors to interact. Users can add new devices to the network, and they immediately become available to other devices. The protocol for "discovering" such a new device is also standardized. A device can act as a controlling device, thereby controlling another device, called the controlled device. For example, a tuner/decoder may control an amplifier or speakers. This type of control is typically done in a vendor-specific fashion, as it requires access to the internal hardware of the controlled devices. To allow arbitrary devices to interact with another device, standards such as HAVi or D2B define the concept of an abstract representation (AR), which provides an interface to the functionality of a controlled device. Application devices wishing to interact with a controlled device can now interact with the AR, installed on a controlling device, rather than directly with the controlled device itself. The controlling device then translates the information received from said application device into instructions, possibly in a proprietary fashion, which are sent to the controlled device. Any feedback from the controlled device is translated back and sent to the application device.

Communication systems of this kind are typically designed for use with a single bus. However, it may become necessary to interconnect two such systems, often referred to as clusters. To do this, a gateway device can be added to each cluster, and the gateway devices are interconnected to allow messages from one cluster to be transferred to another. The gateway devices can, for example, communicate over a wireless link, thereby preventing the user from having to add new wiring. Gateway devices can also be used when two clusters use different standards for exchanging messages, data and commands. The gateway devices then translate information from a first set of communication protocols to another and vice versa. Such a setup is sometimes referred to as a bridge, formed by the gateway devices, between the two clusters. However, when interconnecting two clusters in this fashion, there is the problem that most standards assume that only a single cluster is used, and there is no provision for a device in a second cluster to interact with an AR in a first cluster. In the past this problem has been overcome by installing the AR on another device in the second cluster, so that the device wishing to interact can do so without requiring specialised hardware or software. The other device, holding the AR, communicates with the controlled device in the first cluster to provide seamless interaction between the device wishing to interact and the controlled device. The device holding the AR can be said to function as a proxy between the device wishing to interact and the controlled device. A disadvantage of this approach is that the AR must be installed on a device in the second cluster before other devices on that cluster can use it. When there are many clusters or many devices with associated ARs, it is not practical to install all ARs on some device in every cluster. Indeed, installing a large proxy for each device in each cluster, even for a small number of clusters, is a tedious and time consuming task. Devices being introduced and removed from clusters on a regular basis exacerbates the problem. Furthermore, a direct link between the cluster having the controlled device and the cluster having the device wishing to use the controlled device is required in order to allow the controlling device to control the controlled device. The present invention seeks to provide a communication system in which devices on one cluster can access functionality on devices in another cluster in a flexible and efficient way.

According to one aspect of the present invention, there is provided a bridging system for a communication system comprising a first gateway and a second gateway arranged to communicate with each other, each gateway being connectable to a different bus of the communication system, the first gateway being operative to communicate details of available devices on its respective bus to the second gateway, the second gateway being operative to generate at least one proxy element corresponding to each of said available devices, each proxy element being operative to communicate data and messages between devices on the bus of the second gateway and the device on the first gateway corresponding to the proxy element.

The second gateway may be operative to communicate details of available devices on its respective bus to the first gateway, the first gateway being operative to generate at least one proxy element corresponding to each of said available devices, each proxy element being operative to communicate data and messages between devices on the bus of the first gateway and the device on the second gateway corresponding to the proxy element.

Each gateway may be controllable so that only selected details of available devices are communicated to the other gateway. Each gateway may be controllable so that only details of selected available devices are communicated to the other gateway.

Each bus maintains a registry in which details of devices available on that bus are registered. Preferably, each gateway is operative to register with the registry to receive new details of devices becoming available on the bus.

Details of an available device may include functional component modules, the generated proxy element comprising a proxy functional component module.

Details of an available device may include cable plugs, the generated proxy element comprising a proxy cable plug.

Details of an available device may also include device control modules, the proxy element comprising the user interface of the device control module.

Details of an available device may include isochronous data transmissions, the proxy element comprising a proxy isochronous connection. The proxy isochronous connection may be operative to decode received isochronous data transmissions and re-encode the isochronous data for transmission on a remote bus. An isochronous data connection may only be set up if sufficient resources are available on all busses and gateway connections involved. An isochronous data connection may be set up by each proxy element or proxied element issuing a connection request to its bus' respective isochronous resource manager.

A proxy element may comprise code and at least a part of a data table held by a gateway. Each proxy element on each bus may be assigned a new id. The data table may be a routing table mapping the id of the proxy element to the id of the proxied element on the other bus.

The first and second gateways may be implemented in a single device.

A connection between devices on remote bus may be represented as an internal connection by a gateway.

Preferably, the communication system is HAVi compliant.

An example of the present invention will now be described in detail with reference to the accompanying drawings, in which.

Figure 1:
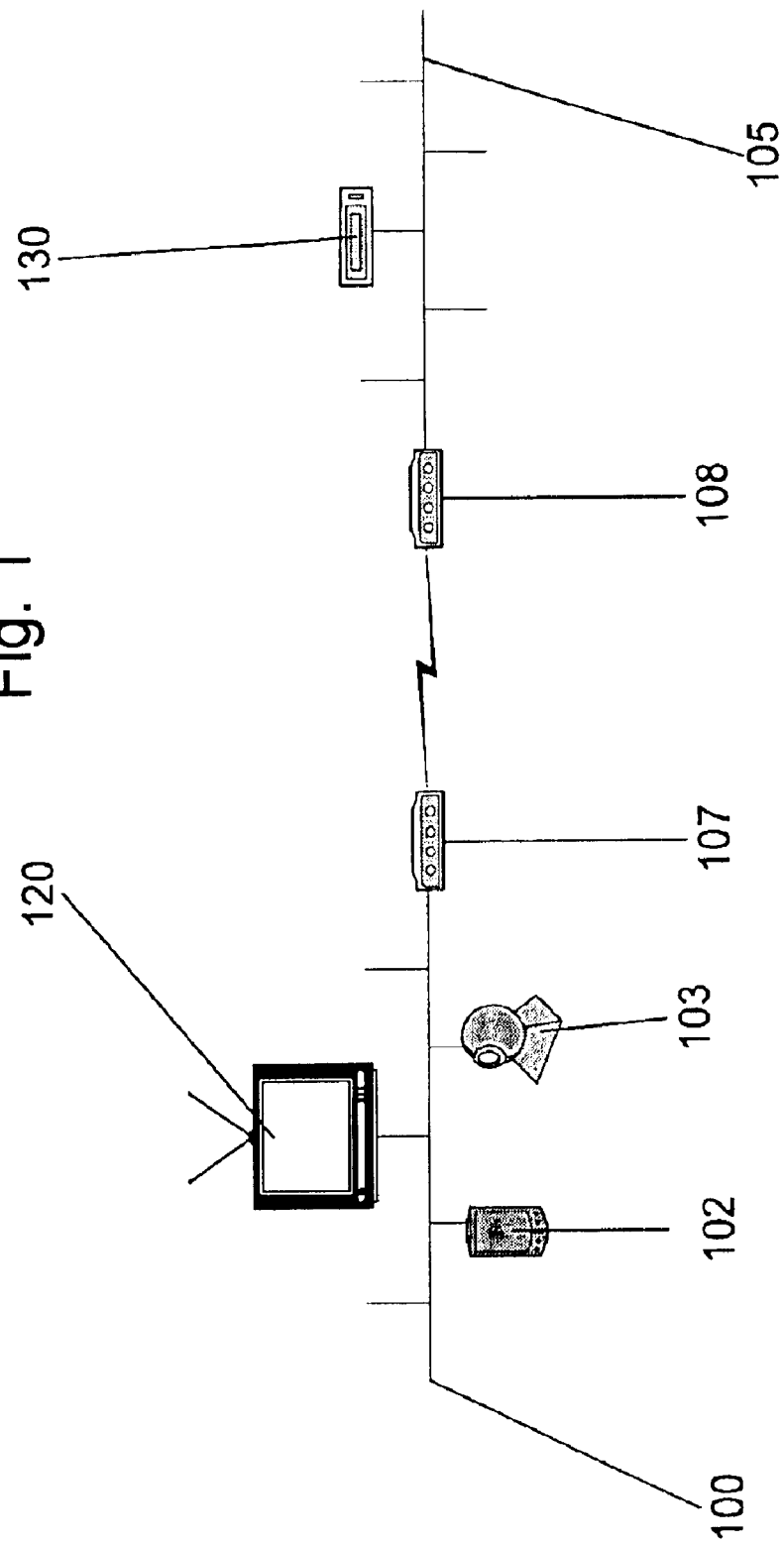
FIG. 1 is a block diagram of a communication system incorporating a bridging system according to the invention.

FIG. 1 is a block diagram of a communication system incorporating a bridging system according to the invention. The communication system comprises a first cluster and a second cluster of devices. The devices in the first cluster are interconnected via a communication network 100, for instance based on IEEE 1394, using the same higher-level communication protocols. The devices in the second cluster are similarly connected via a respective communication network 105. The first and second communication networks 100, 105 are themselves interconnected via a bridging system comprising two gateway devices 107, 108, where gateway device 107 resides in the first network 100 and gateway device 108 in the second network 105. There is some kind of communication network between the gateway devices 107 and 108 over which information such as messages, data and commands can be sent from one cluster to the other. This network can be any type of network, for example a wireless link. It is possible that the clusters use different communication protocols in their respective communication networks. In such a case, the gateway devices must be arranged to translate messages received from the transmitting cluster to the protocol used in the receiving cluster, and vice versa. The first cluster has, amongst other devices, a controlling device 102 and a controlled device 103. The functionality of the controlled device 103 is made available through an interface, called an abstract representation (AR). This interface is installed on the controlling device 102. The interface is made available through the API (Application Program Interface) of this AR. This API is the access point for applications to control the controlled device. For instance, an intelligent television 120 in the family room might be the controlling device for a number of controlled devices. A controlled device could contain code that constructs a user interface for the controlled device and allows external control of the controlled device. When such a device is first connected, the controlling device, e.g. said intelligent television, obtains the user interface and control code for any available devices that can be controlled. An icon representing the controlled device may then appear on the television screen, and manipulating the icon may cause elements of the control code to actuate the represented device or devices in prescribed ways. It should be noted that it is possible that the controlled device 103 and the controlling device 102 are realized in one physical device. While in reality there is a smoother continuum of device capabilities than is acknowledged here, the following categorization is useful in understanding the model of this system. The communication capabilities of the devices in this generic example have different levels of sophistication.

Figure 2:
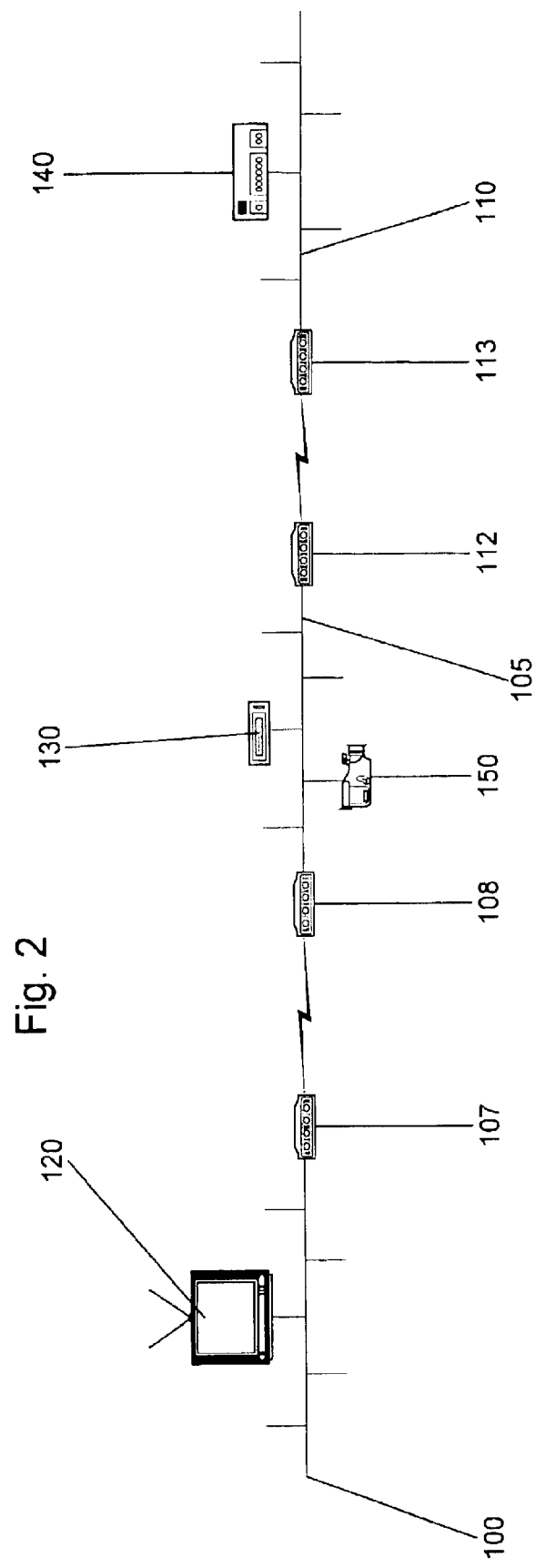
FIG. 2 is a block diagram of a communication system incorporating a number of bridging systems according to the invention; and, FIG. 3 is the block diagram of the communication system of FIG. 2 illustrating selected elements in more detail.

FIG. 2 is a block diagram of a communication system incorporating a number of bridging systems according to the invention, the communication system comprising a first cluster, a second cluster, and a third cluster of devices. The devices in the first cluster are interconnected via a communication network 100, for instance based on IEEE 1394, using the same higher-level communication protocols. The devices in the second and third clusters are similarly connected via respective communication networks 105, 110. The first and second clusters and the second and third clusters are themselves interconnected via respective bridging systems comprising respective gateway devices 107, 108, 112, 113, where gateway device 107 resides in the first network 100, gateway devices 108 and 112 in the second network 105 and gateway device 113 in the third network. There is some kind of communication network between the gateway devices 107, 108, 112, 113 over which information such as messages, data and commands can be sent from one cluster to the other. As before, the first network 100 has, amongst other devices, a controlling device 102 and a controlled device 103. The functionality of the controlled device 103 is made available through an interface, called an abstract representation (AR).

Dependent on their communication capabilities, devices are classified according to one of the following classes:

Controlling devices: A distinction can be made between the following two types of controlling devices:

Full AV Device (FAV)—A Full AV device generally has a rich set of resources and is capable of supporting a complex software environment. The primary distinguishing feature of a FAV device is the presence of a runtime environment for executing an abstract representation (AR) for a controlled device. This allows a FAV device to upload an AR from other devices or via other local area or wide area communication networks and to so provide enhanced capabilities for their control. The FAV device may also be able to download applications/features. Preferably, the downloaded code is some form of executable code of a virtual machine, e.g. Java or similar bytecodes. Likely candidates for FAV devices are Set Top Boxes (STB), digital TV receivers (DTV), general-purpose home control devices, and even home PCs.

Intermediate AV Device (IAV)—Intermediate AV devices are generally lower in cost than FAV devices and more limited in resources. They do not provide a runtime environment for downloadable ARs and so cannot act as controlling devices for arbitrary devices within the system. However, an IAV device may provide native support for control of particular controlled device(s) in the system.

Controlled devices: A distinction can be made between the following two types of controlled devices:

Base AV Device (BAV)—These are devices that, for business or resource reasons, provide an uploadable AR, but the devices themselves do not execute an AR. These devices can be controlled by a controlling device, by a FAV device via the uploadable bytecode or by an IAV device via native code. The protocol between the BAV device and its controlling device is typically proprietary. Communication between a controlling device and a BAV device requires that commands for the AR are translated to and from the command protocol used by the BAV device. Translation is performed by the controlling device executing the AR.

Legacy AV Device (LAV)—LAV devices are devices that do not comply with the described system architecture and communication protocols. Typically, such devices were built before the standard was agreed. These devices use proprietary protocols for their control, and usually have simple control-only protocols. Such devices can work in the home network but require that FAV or IAV devices act as a gateway. Communication between a Full or Intermediate AV device and a legacy AV device requires that commands be translated to and from the legacy command protocol.

Figure 3:
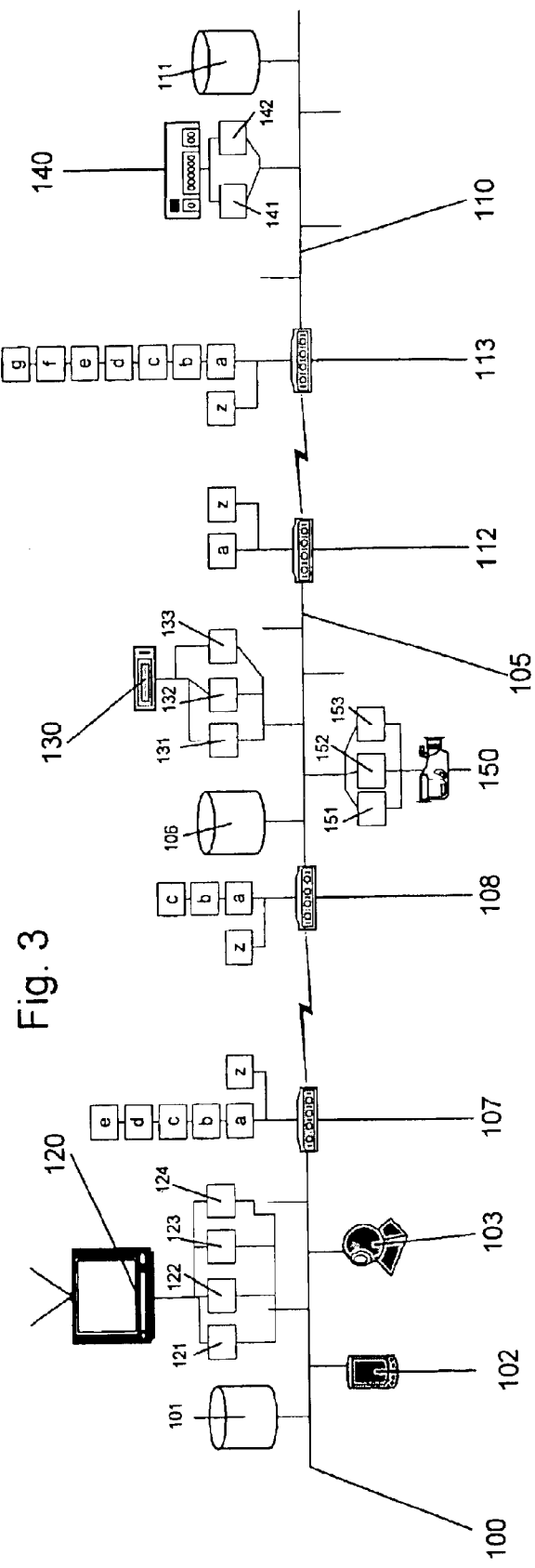

FIG. 3 is the block diagram of the communication system of FIG. 2 illustrating selected elements in more detail. During the course of interaction, devices exchange messages, commands and data in a peer-to-peer fashion. This ensures that, at the communication level, no one device is required to act as a master or controller for the system. However, it also allows a logical master or controller to impose a control structure on the basic peer-to-peer communication model. The AR is a software element used to control a device. An AR may comprise code for the AR itself. It may also comprise code for Functional Component Modules (FCMs) for each functional component within the controlled device. FCMs represent functionality on a device—some devices have several FCMs, for example, a camcorder 150 might have a camera FCM 151 to represent the camera functionality and a VCR FCM 152 to represent the ability of the device to record information. An FCM is a software abstraction of a functional component providing the functionality of that functional component. Other devices do not communicate with an AR directly but only through the FCM. An FCM can receive requests and can communicate with other objects via a messaging system. For example, an AR for the VCR 130 may comprise separate FCMs 131, 132 for the tape deck and the tuner; an AR for the TV 120 may comprise separate FCMs 121, 122, 123 for the monitor, PIP (picture in picture display) and tuner. An AR may also include a device control application 124, 133, 153, called a Device Control Module or DCM,—a software element allowing user control of the device and its functional components. To allow other devices in a cluster to locate and access functionality contained in an AR, each cluster maintains a registry 101, 106, 111 containing identifiers which can be used to locate all devices in that cluster. Devices can query the registry to find out the devices and functional components available and to get a software element identifier to allow them to interact with the device via the DCMs and the FCMs. The registry may be distributed across each FAV and IAV in a cluster.

Connections between devices in HAVi are made via "Plugs". These are software data structures maintained by devices for establishing and holding connection data. There are three types of plugs: FCM Plugs, Cable Plugs and IecPlugs.

FCMs often have the ability to input and output streams of data—in the above example of a camcorder having camera and VCR FCMs, the camera FCM would be able to output a video stream and the VCR would be able to input a video stream, and then output it again later. As FCM plugs represent the ability to source or sink a data stream, the camera FCM may have 1 output FCM plug, and the VCR FCM may have 1 input and 1 output FCM plug.

Any possible external connection which is not a 1394 type connections, such as SCART, sound and video leads, is represented by a cable plug. The camcorder might have a single composite video output and no inputs, so it would have 1 output cable plug and zero input cable plugs. We might later request (via HAVi on the appropriate bus) that the camcorder 150 connects the output plug of its camera to the output cable plug, at which point a picture would appear on a TV connected to our composite video out line.

On top of the 1394 protocol stack is a layer known as 1883 (short for IEC61883). This layer includes methods of wrapping up messages to put them into low level 1394 packets, and it also defines plug control registers. A plug control register (PCR) may be an iPCR (input) or oPCR (output), and our camcorder would probably have one oPCR and no iPCRs. The external appearance of the device would be the same if it had 10 iPCRs, but then it would appear to other devices on the 1394 bus that this device could sink 10 separate streams. PCRs contain a counter of the number of streams connected via them and a broadcast bit, along with various other speed control, etc. flags. When the registers show that nothing is connected the PCR hardware turns off the stream. When the number is incremented or the broadcast bit is set the device transmits an isochronous data stream. iPCRs don't transmit data streams they instead start to read in a data stream, assuming one is present on the channel in question. iPCRs and oPCRs can be connected to FCM plugs in the same manner as cable plugs, and requests to do this are done via HAVi. IecPlugs represent PCRs on a device.

In order to transparently accommodate devices from one cluster controlling devices in another, remote, cluster, gateway devices in the present invention are implemented to generate and offer proxy FCMs to devices in the cluster in which they reside. The proxy FCMs correspond to FCMs of devices available in the cluster in which the gateway communicates with. For example, the intelligent TV 120 would be offered proxy FCMs 107a–107e enabling control of the VCR 130 and camcorder 150 in another room and the central heating system 140 of the house. The proxy FCMs correspond to real FCMs 151, 152, 131, 132 and 141 respectively. Proxy FCMs operate primarily as message forwarders, receiving messages addressed to the device that they are representing and repeating the same message verbatim to the opposite bus via the corresponding gateway device. In the above example, the VCR 130 and camcorder 150 will have proxy FCMs in gateway devices 107 and 113 whilst the central heating system 140 will have proxy FCMs in gateway devices 112 and 107. To the TV 120 or a user controlling the TV 120, it appears the VCR 130, camcorder 150 and heating system 140 are part of the gateway 107. In fact, a message from the TV 120 to the tuner FCM 132 of the VCR 130 will be received by proxy FCM 107b at the gateway 107, transmitted to gateway 108 and broadcast on bus 105 for receipt by the FCM 132 of the VCR 130. Equally, a message from the TV 120 to the heating system FCM 141 is received at FCM 107e of the gateway 107, transmitted to gateway 108 which in turn transmits the message to a proxy FCM 112a of gateway 112. Gateway 112 transmits the message to gateway 113 which passes the message to the heating system FCM 141.

A proxy element, such as a proxy FCM is typically implemented in the native environment of a gateway as code and a data table.

Each gateway is preferably implemented as an IAV or an FAV. Because each proxy element is treated in the same way by a gateway, it can be generated as, for example, java bytecode without the gateway device possessing complex runtime environment and processing capabilities. Each gateway has a DCM 107z, 108z, 112z and 113z running on its attached bus allowing control of the gateway and, among other things, which FCMs and other elements to present on the opposite bus. Available options may include:

All
Some (to avoid congestion)
None (for privacy, for example)
Some, password protected A gateway device operates by registering to receive notification of new FCMs and DCMs that become available from a registry of the bus to which it is connected. When such a new FCM becomes available, the gateway device transmits this availability to its opposite gateway device. The opposite gateway device generates a proxy FCM with a new identifier for each FCM and registers the proxy FCM using the new identifier with the registry of the bus to which it is attached. The new identifier associates the proxy FCM with the gateway device. Messages received by the gateway device with a new identifier have the new identifier replaced by the original identifier. Messages are then transmitted to the opposite gateway for onward transmission. The identifier of a proxy FCM and its corresponding original identifier are held in a lookup table at the gateway.

When a new DCM becomes available, the DCM's identifier is stored by the gateway to send to the opposite gateway. DCMs received at a gateway are presented on its bus as submenus of the gateway's DCM.

It will be appreciated that messages may be passed across multiple busses and through multiple gateways, each FCM having a proxy FCM on each remote bus, the proxy FCMs having a different identifier for each bus. As long as circular bus connections are avoided, routing is automatic and completely scalable.

Whilst the above system operates well for asynchronous communications, further functionality is required to support isochronous channels such as audiovisual media stream transmissions. With no special arrangements, a source would only transmit onto its local bus.

Data in isochronous streams is transmitted across a 1394 bus as 1394 format packets. These packets are very similar to asynchronous packets. In order to provide a guaranteed quality of service on the bus, transmissions are controlled by the pre-reservation of bandwidth. One device on each bus is set as an Isochronous Resource Manager (IRM). An isochronous stream must be sent on a reserved channel and in reserved bandwidth. These are reserved via communications with the respective IRM. Once a channel and enough bandwidth have been reserved, a device may transmit isochronous data onto the bus. It is allowed to transmit when it is its turn, and transmits a standard 1394 packet which goes to all the devices on the bus, as with all other HAVi messages.

A device only reads an asynchronous packet if the device is that specified as the destination in the packet header, or if the packet is a broadcast. A device will read an isochronous packet if it has an Input Plug Control Register (iPCR) configured to read from the channel number specified in the isochronous packet header.

An Isochronous stream is typically audio or video (eg: MPEG2 or DVC), but could be of any format. Whilst it would be possible to have the gateway device read in all isochronous streams from its respective bus, and retransmit them all on the opposite side a number of things make this impractical. In particular, connections between gateways are typically of limited bandwidth and it is undesirable to send all the data across the connection when often none is needed. Therefore, a selection process is used to control which streams to are to be sent through the gateway.

In the communication system of the present invention, a gateway receiving an isochronous communication reads the stream from the source bus and transfers it as a new stream on the remote bus.

Because isochronous streams are time-sensitive, the possibility that two buses operating independently will run at different speeds must be addressed. When a gateway device receives an isochronous stream packet that has been selected and set-up for transmission on the opposite bus it decodes the packet to the raw data stream such as MPEG or DVC. The raw data is transmitted to the opposite gateway which re-encodes the MPEG2/DVC stream back into 1394 isochronous packets, and transmits them onto the remote bus with a new header and possibly a new time stamp. This means that the retransmitted packets do not have to be of the same type or have the same transmission rate as those on the first bus, so long as the data is delivered correctly in an appropriate format.

The device proposing the stream makes a connection on the first bus via the local stream manager. On further busses, proxies must be set up to propose a corresponding connection to the local stream manager. A connection can then be established between the proxy and a device or a further gateway.

When a connection request is received by the DCM of a gateway, the gateway sends a stream connection request to the opposite gateway. The opposite gateway attempts to reserve the necessary channel and bandwidth from the IRM on its local bus. The two gateways also attempt to allocate appropriate resources on their bridge connection to support the stream transmission. The remote gateway also sends a connection request to its target DCM. If any of the reservations or the allocation fails, the gateway noting the failure communicates this to the opposite gateway which disconnects the successful part(s) of the connection.

A bridging system according to the present invention may be configured to export cable plugs available on a bus. An exported cable plug is represented by a proxy cable plug at the opposite gateway in a similar manner to proxy FCMs. When a device on a remote bus communicates with a gateway to establish a connection with a device on a remote bus an 1883 connection is initially attempted. If this fails, a cable connection may be attempted. If a compatible combination of a cable plug on a source device and a cable plug on a target device is found a connection may be made. On the bus the connection is represented by a cabled connection between the source and sink cable plugs, one or both of which may be a proxy. On the local bus the initiating device requests a connection, and automatically via the local gateway the opposite gateway is requested to make the connection on the opposite bus. Communications on each bus are re-stamped so that they appear to originate from the proxy at the local gateway.

The bridging system described above is implemented to be transparent to other devices. Any proxy element hosted by a gateway functions, when viewed from devices on a bus local to that gateway, in the same manner as the actual element would if it was on the local bus. In each case the proxy element possesses a substitute identifier to which communications from the local bus are addressed. A communication received at a gateway addressed to a proxy element is transmitted to the opposite gateway, restamped with the actual elements identifier and transmitted on the bus for receipt by the element. It can be seen that more than one gateway could be hosted by each bus and an element could be seen by devices that are remote by more than one bus.

Whilst the above description has been directed to proxy elements for FCMs, cable plugs and elements suitable for supporting export of DCM interfaces and isochronous stream transmissions, the principles of the present invention are applicable to other elements. For example, application modules (AMs) implementing software algorithms or similar could be proxied. When proxied and registered on another bus, elements can be seen by devices on that bus and sent messages. A message received by a proxy device is forwarded to the real device. Communications in the opposite direction are directed from the real device to a proxy of the communicating device on the real device's local bus which forwards it on to the communicating device.

As has been discussed above, in communication systems such as HAVi communications are broadcast to all available devices and the devices to which they are addressed or are configured to accept the communications read them. Obviously, once a number of bridges between busses are implemented this traffic will spread across all the linked busses. The concept of selective routing of streams and selective bridging of elements such as FCMs has been discussed above. This could be extended so that a connection between devices on a remote bus is represented in a gateway as a connection between two FCMs within the gateway itself. This prevents the traffic appearing on the local bus.

What is claimed is:

1. A bridging system for a communication system comprising: a first gateway and a second gateway arranged to communicate with each other, each gateway being connectable to a different bus of the communication system, the first gateway being operative to communicate details of available devices on its respective bus to the second gateway, the second gateway being operative to generate at least one proxy element corresponding to each of said available devices, each proxy element being operative to communicate data and messages between devices on the bus of the second gateway and the device on the first gateway corresponding to the proxy element wherein a communication between devices is started when sufficient resources are available on the busses and gateway connections.

2. A bridging system according to claim 1, in which the second gateway is operative to communicate details of available devices on its respective bus to the first gateway, the first gateway being operative to generate at least one proxy element corresponding to each of available device, each proxy element being operative to communicate data and messages between devices on the bus of the first gateway and the device on the second gateway corresponding to the proxy element.

3. A bridging system according to claim 1, in which each gateway is controllable so that only selected details of available devices are communicated to the other gateway.

4. A bridging system according to claim 3, in which each gateway is controllable so that only details of selected available devices are communicated to the other gateway.

5. A bridging system according to claim 1 in which each bus is coupled to a registry in which details of devices available on that bus are registered, each gateway being operative to register with the registry to receive new details of devices becoming available on the bus.

6. A bridging system according to claim 1, in which details of an available device include functional component modules, the generated proxy element comprising a proxy functional component module.

7. A bridging system according to claim 1, in which details of an available device include cable plugs, the generated proxy element comprising a proxy cable plug.

8. A bridging system according to claim 1, in which details of an available device include device control modules, the proxy element comprising a user interface of the device control module.

9. A bridging system according to claim 1, in which details of an available device include isochronous data transmissions, the proxy element comprising a proxy isochronous connection.

10. A bridging system according to claim 9, in which the proxy isochronous connection is configured to decode a received isochronous data transmissions and re-encode the isochronous data for transmission on a remote bus.

11. A bridging system according to claim 1, in which a proxy element comprises code and at least a part of a data table held by a gateway.

12. A bridging system according to claim 11, in which each proxy element on each bus is assigned a new id.

13. A bridging system according to claim 12, in which the data table is a routing table mapping the id of the proxy element to the id of the proxied element on the other bus.

14. A bridging system according to claim 1, in which the first and second gateways are implemented in a single device.

15. A bridging system according to claim 1, in which a connection between devices on a remote bus is configured as an internal connection by a gateway.

16. A bridging system according to claim 1, in which the communication system is HAVi compliant.

17. A bridging system for a communication system comprising a first gateway and a second gateway arranged to communicate with each other, each gateway being connectable to a different bus of the communication system, the first gateway being operative to communicate details of available devices on its respective bus to the second gateway, the second gateway being operative to generate at least one proxy element corresponding to each of said available devices, each proxy element being operative to communicate data and messages between devices on the bus of the second gateway and the device on the first gateway corresponding to the proxy element, wherein details of an available device include isochronous data transmissions, the proxy element comprising a proxy isochronous connection and an isochronous data connection is only set up if sufficient resources are available on all busses and gateway connections involved.

18. A bridging system according to claim 17, in which an isochronous data connection is set up by each proxy element or proxied element issuing a connection request to a respective bus' stream manager.

* * * * *